E. L. TEICH.
ANTIFRICTION WASHER FOR HINGES, &c.
APPLICATION FILED FEB. 8, 1909.
924,511.
Patented June 8, 1909.
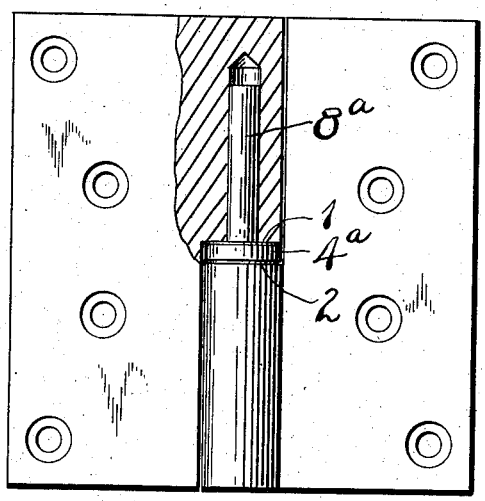
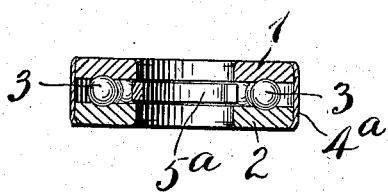 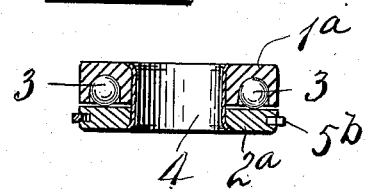
Witnesses.
Inventor
E. L. Teich

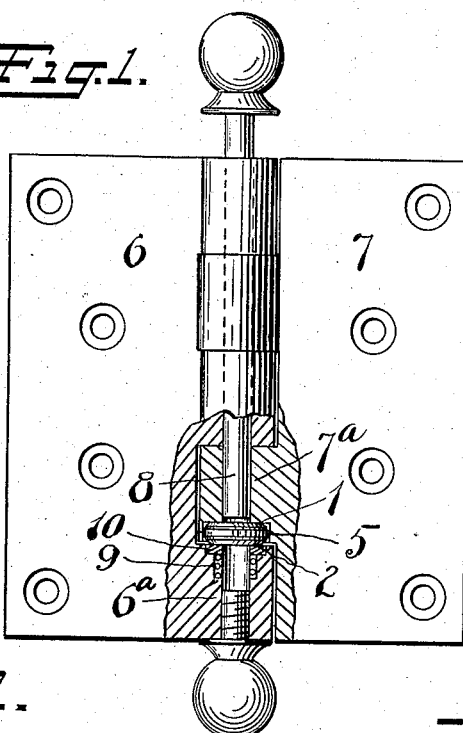

UNITED STATES PATENT OFFICE.

ERNEST L. TEICH, OF NEW BRITAIN, CONNECTICUT, ASSIGNOR TO P. & F. CORBIN, OF NEW BRITAIN, CONNECTICUT, A CORPORATION OF CONNECTICUT.

ANTIFRICTION-WASHER FOR HINGES, &c.

No. 924,511.  Specification of Letters Patent.  Patented June 8, 1909.

Application filed February 8, 1909. Serial No. 476,601.

*To all whom it may concern:*

Be it known that I, ERNEST L. TEICH, a citizen of the United States, residing at New Britain, county of Hartford, State of Connecticut, have invented certain new and useful Improvements in Antifriction - Washers for Hinges, &c., of which the following is a full, clear, and exact description.

My invention relates to improvements in anti-friction washers, the same being of particular utility when employed for hinges and like devices.

In the accompanying drawing, I have shown my invention as applied in connection with a hinge.

In the drawings, Figure 1 is a front elevation of an open hinge, certain knuckles being shown in section and showing the anti-friction washer in place, the pintle being partially removed. Fig. 2 is a plan view of the anti-friction washer, relatively enlarged. Fig. 3 is an edge elevation thereof. Fig. 4 is a cross-section of said washer. Fig. 5 is a plan view of a detail. Fig. 6 is a section of a washer of modified form, in a hinge of another type than that shown in Fig. 1. Fig. 7 is a cross-section of the washer shown in Fig. 6 (relatively enlarged). Fig. 8 is a cross-section of another modification.

Referring first to the construction illustrated in Figs. 1 to 5, the anti-friction device will be seen to comprise two washer-plates 1—2 which constitute the bearings. 3 represent balls which constitute the anti-friction devices between the bearing plates 1 and 2. The adjacent faces of the bearing plates 1 and 2 have annular grooves facing each other and adapted to form between them a race-way for the balls 3. 4 is a retaining sleeve operating to hold the two plates 1 and 2 against accidental disengagement and in proper alinement, but permitting the same to turn independently. As shown in Fig. 4, the retaining sleeve is arranged within the bore of the plates and has its ends flanged outwardly to hold these parts in place. 5 is a friction device which may be in the form of a C-shaped spring (or split ring) located in the space surrounding the balls 3—3 and between the plates 1—2. 6—7 represent hinge leaves. 6ª represents the knuckles on the leaf 6. 7ª represents the knuckles on the hinge leaf 7. It will be observed that the end of the knuckles 7ª may be recessed to receive the anti-friction washer, the diameter of the recess being sufficiently larger than the diameter of the washer to permit the same to be freely entered, the friction spring 5 engaging the side wall of the recess and serving to prevent the accidental disengagement of the anti-friction washer from the hinge leaf. The passage through the sleeve 4 corresponds substantially in diameter to the bore through the knuckles 6ª 7ª, whereby a pintle 8 may be readily passed through the knuckle and through said washer. When the knuckles 6ª 7ª are placed together and the hinge leaves assembled, the anti-friction washer will be practically concealed. The depth of the recess in which the anti-friction device is located, should be such as to permit the outer washer plate to stand sufficiently beyond the end of the knuckle which carries the same so as to engage and support the adjacent end of the adjacent knuckle. Thus, when weight is put upon the hinge, the same will be transmitted to the balls 3—3 arranged in the race-way between the said plates or washers 1—2, permitting the hinge to be operated with the greatest freedom even when under strain.

In Figs. 6 and 7, I have shown a modification in which the construction of the parts 1, 2 and 3 corresponds to the similar parts shown in Figs. 1 to 5. In this case, however, the sleeve 4ª is arranged externally of the washer plates 1 and 2 and the retaining spring 5ª is arranged adjacent to the bore of the anti-friction washer instead of being arranged around the periphery of the same. By this arrangement the washer may be frictionally retained on the hinge pintle 8ª (Fig. 6).

In the modification shown in Fig. 8, 1ª 2ª represent the bearing plates and in this instance the race-way is formed entirely within the plate 1ª. 3—3 are the balls as before. 4 is the retaining sleeve, and 5ᵇ is the spring. In this instance the spring 5ᵇ, instead of being located in the space between the plates 1ª 2ª, is located in an annular groove formed in the outer periphery of the washer plate 2ª.

My invention is of particular utility in that is allows for variation that is bound to exist either in the external diameter of the washer or in the internal diameter of the recess arranged to receive the washer. If, as frequently happens in devices of this general character, as they have previously existed and as applied to hinges, the recess in the end of the knuckle is slightly smaller or too snug to receive the anti-friction device, it involves the forcing in of the latter, or the cutting down of the latter to a size appropriate for the recess. This, in the first instance, endangers breakage and imperfect action, and in the second instance, involves unnecessary and expensive labor. It is quite essential that the anti-friction device fit snug to prevent accidental loss, hence great care at correspondingly great expense has heretofore been required in the making of such devices. By my invention the anti-friction device may be made perceptibly smaller than the bore in the recess in which it stands and yet the action of the friction spring 5 is such as to retain the anti-friction device against accidental disengagement. It should be stated that this retaining means may be varied in many ways so long as its function is preserved.

In hinges embodying this construction the anti-friction device is protected from dust and dirt, and the various parts may be quickly made and assembled at minimum speed and cost, without sacrifice to the durable quality.

In Fig. 1, I have shown a pintle retaining spring 9 for engaging the lower end of the pintle when in place. This pintle retaining spring 9 is held in place by a bushing 10.

It should be understood that by this invention, it is unnecessary to provide hardened steel bushings at the ends of the knuckles where the anti-friction washer is located because the bearing plates 1 and 2 are properly hardened to stand the pressure of the balls.

What I claim is:

1. In an anti-friction washer, a pair of bearing plates having a race, a plurality of anti-friction devices in said race and a spring retainer carried by said washer arranged to engage an adjacent wall, and means to hold said parts assembled.

2. In an anti-friction washer, a pair of annular bearing plates having a ball race, a series of balls in said race and a spring retainer carried by said washer arranged to engage an adjacent wall, and means to hold said parts assembled.

3. In an anti-friction washer, a pair of annular bearing plates having a ball race, a series of balls in said race, and a spring retainer carried at the outer edge thereof arranged to engage an adjacent wall, and means to hold said parts assembled.

4. In an anti-friction washer, a pair of annular bearing plates having a ball race, a series of balls in said race, and a C-shaped spring retainer at the outer edge thereof arranged to engage an adjacent wall, and means to hold said parts assembled.

5. In an anti-friction washer, a pair of annular bearing plates having a ball race, a series of balls in said race, and a C-shaped spring retainer carried at the outer edge thereof and arranged between the two plates arranged to engage an adjacent wall, and means to hold said parts assembled.

6. In an anti-friction hinge, an anti-friction washer comprising a pair of bearing plates having a race-way, anti-friction devices in said race-way, means for holding said plates against disengagement, but permitting independent rotation, and means carried by said washer for holding said washer frictionally in place said retainer operating to engage an adjacent side wall.

7. In an anti-friction hinge, a pair of leaves, said leaves having companion knuckles, a recess in one end of one of said knuckles for an anti-friction washer, an anti-friction washer arranged in said knuckle and means carried by said washer for frictionally holding the same in said recess to prevent accidental disengagement.

8. In an anti-friction hinge, a pair of leaves, said leaves having companion knuckles, a recess in one end of one of said knuckles for receiving an anti-friction washer, an anti-friction washer arranged in said knuckle and means carried by said washer for frictionally holding the same in said recess to prevent accidental disengagement, said means comprising a C-shaped spring arranged in an annular groove in the periphery of said washer.

9. In an anti-friction hinge, comprising a plurality of leaves having companion knuckles, an anti-friction washer arranged in a recess in one of said knuckles and comprising two annular plates, anti-friction devices between them, a groove in the outer side of said washer, an expansible split ring spring standing in said groove, the outer diameter of said spring being greater than the inter-diameter of said recess.

ERNEST L. TEICH.

Witnesses:
G. ERNEST ROOT,
WM. V. COLLIN.